United States Patent
Stark et al.

(10) Patent No.: US 7,666,965 B2
(45) Date of Patent: Feb. 23, 2010

(54) METHOD FOR PRODUCTION OF MIXED POLYMERS CONTAINING SILICON

(75) Inventors: Kurt Stark, Weilersbach (DE); Christian Högl, Reut (DE)

(73) Assignee: Wacker Chemie AG, Munich (DE)

( * ) Notice: Subject to any disclaimer, the term of this patent is extended or adjusted under 35 U.S.C. 154(b) by 512 days.

(21) Appl. No.: 10/598,650

(22) PCT Filed: Mar. 3, 2005

(86) PCT No.: PCT/EP2005/002271

§ 371 (c)(1),
(2), (4) Date: Mar. 22, 2007

(87) PCT Pub. No.: WO2005/087827

PCT Pub. Date: Sep. 22, 2005

(65) Prior Publication Data

US 2007/0179245 A1    Aug. 2, 2007

(30) Foreign Application Priority Data

Mar. 11, 2004   (DE) ....................... 10 2004 011 995

(51) Int. Cl.
C08F 30/08  (2006.01)
(52) U.S. Cl. ........................ 526/279; 526/86
(58) Field of Classification Search ................ 526/279, 526/86
See application file for complete search history.

(56) References Cited

U.S. PATENT DOCUMENTS

| 3,758,425 | A |  | 9/1973  | Jastrow et al. |
| 3,985,824 | A |  | 10/1976 | Lederer et al. |
| 5,618,879 | A |  | 4/1997  | Cavivenc et al. |
| 5,686,531 | A |  | 11/1997 | Engelke et al. |
| 5,688,870 | A | * | 11/1997 | Wilkinson et al. .......... 525/244 |
| 6,602,949 | B2 |  | 8/2003  | Furukawa et al. |

FOREIGN PATENT DOCUMENTS

| EP | 0352339   | A  | 1/1990  |
| EP | 0614924   | A  | 9/1994  |
| EP | 0771826   | A2 | 5/1997  |
| EP | 0810243   | A  | 12/1997 |
| EP | 1308468   | A  | 5/2003  |
| JP | 05-009248 | A  | 1/1993  |
| JP | 05-140255 | A  | 6/1993  |

OTHER PUBLICATIONS

Patent Abstract of Japan corresponding to JP 05-009248.
Patent Abstract of Japan corresponding to JP 05-140255.
Patbase Abstract corresponding to EP 1 308 468 A.

* cited by examiner

*Primary Examiner*—Kuo-Liang Peng
(74) *Attorney, Agent, or Firm*—Brooks Kushman P.C.

(57) ABSTRACT

Polymer dispersions of polymers derived from silicone macromers and ethylenically unsaturated monomers are capable of incorporating large amounts of chemically bonded macromer, when the silicone macromer and part of the unsaturated monomer are polymerized in aqueous medium as an initial charge with an oil soluble initiator, and the remaining monomers are fed in and polymerized using a water soluble initiator. The dispersions may be dried to form water redispersible polymer powders.

7 Claims, No Drawings

METHOD FOR PRODUCTION OF MIXED POLYMERS CONTAINING SILICON

CROSS-REFERENCE TO RELATED APPLICATION

This application is the U.S. national phase of PCT Appln. No. PCT/EP2005/002271 filed Mar. 3, 2005, which claims priority to German application 10 2004 011 995.3 filed Mar. 11, 2004.

BACKGROUND OF THE INVENTION

1. Field of the Invention

The invention relates to a process for preparing silicone-containing copolymers of an ethylenically unsaturated organic monomer and a silicone macromer in the form of their aqueous polymer dispersions or water-redispersible polymer powders.

2. Description of the Related Art

Various methods of preparing polymer dispersions of silicone-modified copolymers are known from the prior art. In EP-A 1308468, such copolymers are prepared by a process in which the total amount of silicone and a partial amount of the monomers are initially charged in an aqueous emulsion and are polymerized in the presence of a water-soluble initiator. EP-A 352339 describes a solution polymerization process in which the silicone component is initially charged in the solvent and a mixture of monomers and oil-soluble initiator is continuously metered in. EP-A 771826 discloses a process for preparing a crosslinked silicone copolymer latex, in which water, monomer, emulsifier and water-soluble initiator are initially charged, the reaction is started, further monomer is slowly metered in and the crosslinking silicone, which has a short chain and is multiply unsaturated, is finally added together with the remaining monomer.

In EP-A 614924, only short-chain silicone macromers are used in the emulsion polymerization, since relatively long-chain silicone macromers do not polymerize sensibly with the organic monomers. U.S. Pat. No. 6,602,949 describes the preparation of silicone-organopolymer graft polymers, in which a branched, short-chain silicone having a dendritic structure is reacted with an ethylenically unsaturated radical, ethylenically unsaturated monomers and a free-radically polymerizable emulsifier in the presence of an oil-soluble initiator. The dendritic structure of the short-chain silicone macromer improves the copolymerization with organic monomers. It is shown in comparative examples that long-chain silicone macromers (without a dendritic structure) have polymerized to an extent of not more than 75% with organic monomers and a large amount of unreacted silicone macromer remains. In EP-A 810243 and JP-A 05-009248, silicone macromers are polymerized with organic monomers in emulsion, exclusively by means of an oil-soluble initiator. A disadvantage of the processes initiated by means of an oil-soluble initiator is the unsatisfactory stability of the resulting dispersions, which display a strong tendency to undergo phase separation.

U.S. Pat. No. 5,618,879 describes the copolymerization of a mixture of silicone macromer and monomer which is emulsified in water by means of an anionic emulsifier, with the polymerization being initiated by means of a water-soluble initiator. In JP-A 05-140255, the silicone macromer is dissolved in the organic monomer, is emulsified in water by means of an anionic emulsifier and the polymerization is initiated by means of a water-soluble initiator. Here too, a disadvantage is that a considerable proportion of over 20% of the silicone macromer is not copolymerized.

In all the processes known from the prior art, the copolymerization of the silicone macromers with organic monomers in emulsion always proceeds only to an unsatisfactory extent. This leads to free silicone remaining in the dispersion, with corresponding disadvantageous consequences: the silicone migrates out of coatings or films; the dispersion can coagulate; and the particle size distribution is inhomogeneous. In addition, the tendency to undergo phase separation has an adverse effect on the storage stability.

SUMMARY OF THE INVENTION

It was therefore an object of the invention to prepare dispersions and redispersion powders of copolymers having a high content of silicone, by emulsion polymerizing silicone macromers with organic monomers in such a way that the incorporation of the silicone macromer occurs significantly more effectively than in the prior art. These and other objects are achieved by a process for preparing silicone-containing copolymers of an ethylenically unsaturated organic monomer and a silicone macromer in the form of their aqueous polymer dispersions or water-redispersible polymer powders by means of free-radically initiated polymerization in an aqueous medium and, if appropriate, drying of the polymer dispersion obtainable in this way, characterized in that the polymerization is carried out in the presence of a water-soluble initiator and an oil-soluble initiator.

DETAILED DESCRIPTION OF THE PREFERRED EMBODIMENTS

In the polymerization, one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides are used as ethylenically unsaturated organic monomers. In general, use is made of from 5 to 95% by weight of the ethylenically unsaturated organic monomers, preferably from 50 to 95% by weight, in each case based on the total weight of the copolymer.

Suitable vinyl esters are vinyl esters of unbranched or branched carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 5 to 13 carbon atoms, for example VeoVa9® or VeoVa10® (trade names of Resolution Performance Products). Particular preference is given to vinyl acetate.

Suitable monomers from the group consisting of the esters of acrylic acid or methacrylic acid are esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl, isobutyl and t-butyl acrylate, n-butyl, isobutyl and tert-butyl methacrylate, 2-ethylhexyl acrylate, norbornyl acrylate. Particular preference is given to methyl acrylate, methyl methacrylate, n-butyl, isobutyl and t-butyl acrylate, 2-ethylhexyl acrylate and norbornyl acrylate.

Suitable dienes are 1,3-butadiene and isoprene. Examples of copolymerizable olefins are ethene and propene. As vinylaromatics it is possible to copolymerize styrene and vinyltoluene. From the group consisting of vinyl halides, it is usual to use vinyl chloride, vinylidene chloride or vinyl fluoride, preferably vinyl chloride.

If desired, from 0.05 to 30% by weight, based on the total weight of the ethylenically unsaturated organic monomers, of auxiliary monomers can be copolymerized. Examples of auxiliary monomers are ethylenically unsaturated monocarboxylic and dicarboxylic acids or their salts, preferably crotonic acid, acrylic acid, methacrylic acid, fumaric acid and maleic acid; ethylenically unsaturated carboxamides and nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids or their salts, preferably vinylsulfonic acid, 2-acrylamido-2-methylpropanesulfonic acid. Further suitable auxiliary monomers are cationic monomers such as diallyldimethylammonium chloride (DADMAC), 3-trimethylammoniopropyl(meth)acrylamide chloride (MAPTAC) and 2-trimethylammonioethyl(meth)acrylate chloride. Other suitable auxiliary monomers are vinyl ethers, vinyl ketones, further vinylaromatic compounds which may also have heteroatoms.

Suitable auxiliary monomers also include polymerizable silanes and mercaptosilanes. Preference is given to gamma-acryloxypropyltri(alkoxy)silanes or gamma-methacryloxypropyltri(alkoxy)silanes, α-methacryloxy-methyltri(alkoxy)silanes, gamma-methacryloxypropyl-methyldi(alkoxy)silanes, vinylalkyl di(alkoxy)silanes and vinyltri(alkoxy)silanes, with possible alkoxy groups being, for example, methoxy, ethoxy, methoxyethylene, ethoxyethylene, methoxypropylene glycol ether or ethoxypropylene glycol ether radicals. Examples are vinyltrimethoxysilane, vinyltriethoxysilane, vinyltripropoxysilane, vinyltriisopropoxysilane, vinyltris(1-methoxy)isopropoxy-silane, vinyltributoxysilane, vinyltriacetoxysilane, 3-methacryloxypropyltrimethoxysilane, 3-methacryloxypropylmethyldimethoxysilane, methacryloxymethyl-trimethoxysilane, 3-methacryloxypropyltris(2-methoxyethoxy)silane, vinyltrichlorosilane, vinylmethyldichlorosilane, vinyltris(2-methoxyethoxy)-silane, trisacetoxyvinylsilane, 3-(triethoxysilyl)-propyl(succinic anhydride)silane. Preference is also given to 3-mercaptopropyltriethoxysilane, 3-mercaptopropyltrimethoxysilane and 3-mercaptopropylmethyldimethoxysilane.

Further examples are functionalized (meth)acrylates and functionalized allyl and vinyl ethers, in particular epoxy-functional compounds such as glycidyl acrylate, glycidyl methacrylate, allyl glycidyl ether, vinyl glycidyl ether, or hydroxyalkyl-functional compounds such as hydroxyethyl (meth)acrylate, or substituted or unsubstituted aminoalkyl (meth)acrylates or cyclic monomers such as N-vinylpyrrolidone; or N-vinylformamide.

Further examples of suitable auxiliary monomers are precrosslinking comonomers such as multiply ethylenically unsaturated comonomers, for example divinyl adipate, divinylbenzene, diallyl maleate, allyl methacrylate, butanediol diacrylate or triallyl cyanurate, or postcrosslinking comonomers, for example acrylamidoglycolic acid (AGA), methyl methacrylamido-glycolate (MMAG), N-methylolacrylamide (NMA), N-methylolmethacrylamide, allyl N-methylolcarbamate, alkyl ethers such as the isobutoxy ether or ester of N-methylolacrylamide, of N-methylolmethacrylamide and of allyl N-methylolcarbamate.

Suitable silicone macromers are linear, branched and cyclic silicones (polysiloxanes) having at least 10 siloxane repeating units and at least one free-radically polymerizable functional group. The chain length is preferably from 10 to 1000 siloxane repeating units. Ethylenically unsaturated groups such as alkenyl groups are preferred as polymerizable, functional groups. The proportion of silicone in the copolymer is preferably from 5 to 50% by weight, most preferably from 20 to 50% by weight, in each case based on the total weight of the copolymer.

Preferred silicone macromers are silicones having the general formula $R^1_a R_{3-a} SiO(SiR_2O)_n SiR_{3-a} R^1_a$, where the radicals R are identical or different and are each a monovalent, substituted or unsubstituted alkyl radical or alkoxy radical having from 1 to 18 carbon atoms, $R^1$ is a polymerizable group, a is 0 or 1 and n=10 to 1000.

In the general formula $R^1_a R_{3-a} SiO(SiR_2O)_n SiR_{3-a} R^1_a$, examples of radicals R are the methyl, ethyl, n-propyl, isopropyl, 1-n-butyl, 2-n-butyl, isobutyl, tert-butyl, n-pentyl, isopentyl, neopentyl, tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical and octadecyl radicals such as the n-octadecyl radical, cycloalkyl radicals such as the cyclopentyl, cyclohexyl, cycloheptyl and methylcyclohexyl radicals. The radical R is preferably a monovalent hydrocarbon radical having from 1 to 6 carbon atoms, e.g. the methyl, ethyl, n-propyl, isopropyl, n-butyl, sec-butyl, amyl and hexyl radicals, with particular preference being given to the methyl radical.

Preferred alkoxy radicals R are those having from 1 to 6 carbon atoms, e.g. the methoxy, ethoxy, propoxy and n-butoxy radicals, which may additionally be substituted by oxyalkylene radicals such as oxyethylene or oxymethylene radicals. Particular preference is given to the methoxy and ethoxy radicals. The abovementioned alkyl radicals and alkoxy radicals R may also be substituted, for example by halogen, mercapto groups, epoxy-functional groups, carboxy groups, keto groups, enamine groups, amino groups, aminoethylamino groups, isocyanato groups, aryloxy groups, alkoxysilyl groups and hydroxy groups.

Suitable polymerizable groups $R^1$ are alkenyl radicals having from 2 to 8 carbon atoms. Examples of such polymerizable groups are the vinyl, allyl, butenyl and also aryloxyalkyl and methacryloxyalkyl groups, with the alkyl radicals having from 1 to 4 carbon atoms. Preference is given to the vinyl group, the 3-methacryloxypropyl group, the acryloxymethyl group and the 3-acryloxypropyl group.

Preference is given to α,ω-divinylpolydimethylsiloxanes, α,ω-di(3-acryloxypropyl)polydimethylsiloxanes, α,ω-di(3-methacryloxypropyl)polydimethylsiloxanes. Among the silicones which are only monosubstituted by unsaturated groups, preference is given to α-monovinylpolydimethylsiloxanes, α-mono(3-acryloxypropyl)polydimethylsiloxanes, α-mono(acryloxymethyl)polydimethylsiloxanes, α-mono(3-methacryloxypropyl)polydimethylsiloxanes. In the monofunctional polydimethylsiloxanes, an alkyl or alkoxy radical, for example a methyl or butyl radical, is present at the other end of the chain.

Preference is also given to mixtures of linear or branched divinylpolydimethylsiloxanes with linear or branched monovinylpolydimethylsiloxanes and/or unfunctionalized polydimethylsiloxanes (the latter have no polymerizable group). The vinyl groups are located at the end of the chain. Examples of such mixtures are silicones of the solvent-free Dehesive®-6 series (branched) or Dehesive®-9 series (unbranched) from Wacker-Chemie GmbH. In the binary or ternary mixtures, the proportion of unfunctional polydialkylsiloxanes is up to 15% by weight, preferably up to 5% by weight; the proportion of monofunctional polydialkylsiloxanes is up to 50% by weight; and the proportion of bifunctional polydialkylsiloxanes is at least 50% by weight, preferably at least 60% by weight, in each case based on the total weight of the silicone macromer.

Most preferred silicone macromers are α,ω-divinylpolydimethylsiloxanes.

The copolymers are prepared by means of free-radical polymerization in an aqueous medium, preferably emulsion polymerization. The polymerization is usually carried out in a temperature range from 20° C. to 100° C., in particular from 40° C. to 80° C. Initiation is effected by means of free-radical formers (initiators) which are preferably used in amounts of from 0.01 to 5.0% by weight, based on the total weight of silicone macromer and organic monomer. Water-soluble initiator and oil-soluble initiator can be added as a mixture or separately from one another and are used in a weight ratio of water-soluble initiator to oil-soluble initiator of from 10:1 to 1:10, preferably from 1:1 to 1:5.

Initiators used are, firstly, water-soluble initiators whose solubility in water under normal conditions is >10% by weight. Examples are water-soluble, inorganic peroxides such as ammonium, sodium, potassium peroxo disulfate or hydrogen peroxide, either alone or in combination with reducing agents such as sodium sulfite, sodium hydrogensulfite, sodium formaldehyde-sulfoxylate or ascorbic acid. It is also possible to use water-soluble organic peroxides, for example t-butyl hydroperoxide (TBHP), cumene hydroperoxide, usually in combination with reducing agents, or else water-soluble azo compounds.

The term oil-soluble initiators refers to initiators whose solubility in water under normal conditions is <1% by weight. As representatives of the group of oil-soluble initiators, use is made of initiators such as t-butyl peroxy-2-ethylhexanoate (TBPEH), t-butyl peroxypivalate (PPV), t-butylperoxyneodecanoate (TBPND), dibenzoyl peroxide, t-amyl peroxypivalate (TAPPI), di(2-ethylhexyl)peroxydicarbonate (EHPC), 1,1-bis(t-butylperoxy)-3,3,5-trimethylcyclohexane and di(4-t-butylcyclohexyl)peroxydicarbonate. Further suitable oil-soluble initiators are azo initiators such as azobisisobutyronitrile (AIBN).

In the case of copolymerization with gaseous monomers such as ethylene and vinyl chloride, the polymerization is carried out under superatmospheric pressure, in general from 1 to 100 $bar_{abs}$.

To stabilize the dispersion, it is possible to use anionic and nonionic emulsifiers and also protective colloids, with these also being able to contain polymerizable groups. Preference is given to using nonionic or anionic emulsifiers, most preferably a mixture of nonionic and anionic emulsifiers. As nonionic emulsifiers, preference is given to using condensation products of ethylene oxide or propylene oxide with linear or branched alcohols having from 8 to 18 carbon atoms, alkylphenols or linear or branched carboxylic acids having from 8 to 18 carbon atoms, and also block copolymers of ethylene oxide and propylene oxide. Suitable anionic emulsifiers are, for example, alkylsulfates, alkylsulfonates, alkylaryl sulfates and also sulfates or phosphates of condensation products of ethylene oxide with linear or branched alkyl alcohols having from 3 to 60 EO units, alkylphenols and monoesters or diesters of sulfosuccinic acid. The amount of emulsifier is from 0.1 to 30% by weight, based on the total weight of the organic monomers and silicone macromers used.

If appropriate, protective colloids can also be used. Examples of suitable protective colloids are polyvinyl alcohols having a content of from 75 to 95 mol %, preferably from 84 to 92% mol %, of vinyl alcohol units; poly-N-vinyl amides such as polyvinylpyrrolidones; polysaccharides such as starches and also celluloses and their carboxymethyl, methyl, hydroxyethyl, hydroxypropyl derivatives; synthetic polymers such as poly(meth)acrylic acid, poly(meth)acrylamide. It is also possible to use polyglycol ethers such as polyethylene glycol, polypropylene glycol or mixed polyalkylene oxides having ethylene oxide and propylene oxide groups. Particular preference is given to using the polyvinyl alcohols mentioned. The use of polyalkylene oxides having at least one polymerizable group but not more than two polymerizable groups, e.g. vinyl or allyl groups, is also preferred. The protective colloids are generally used in an amount of from 0.1 to 30% by weight, based on the total weight of the organic monomers and silicone macromers used.

If appropriate, the molecular weight can be controlled by means of the customary regulators, for example alcohols such as isopropanol, aldehydes such as acetaldehyde, chlorine-containing compounds, mercaptans such as n-dodecyl mercaptan, t-dodecyl mercaptan, mercaptopropionic acid/esters. To set the pH, pH-regulating compounds such as sodium acetate or formic acid can be used in the preparation of the dispersion.

The polymerization can be carried out, regardless of the polymerization process, with or without use of seed latices, with initial charging of all or individual constituents of the reaction mixture or with partial initial charging and metering-in of the constituents or individual constituents of the reaction mixture or by means of the feed stream process without an initial charge. The silicone macromers and organic monomers can all be initially charged to prepare the dispersion (batch process) or part of the silicone macromers and organic monomers are initially charged and the remainder is metered in (semibatch process). The water-soluble initiator and oil-soluble initiator can be added as a mixture or separately.

In a preferred embodiment, all of the silicone macromer and part of the ethylenically unsaturated organic monomers are initially charged and the polymerization is started in the presence of an oil-soluble initiator, and the remainder of the ethylenically unsaturated organic monomer and the water-soluble initiator are subsequently added. The proportion of ethylenically unsaturated organic monomer in the initial charge is preferably from 0 to 60% by weight, more preferably from 5 to 50% by weight. Likewise, the oil-soluble initiator preferably is initially charged in its entirety. The initial charge is preferably polymerized to a conversion of from 10 to 100%, more preferably from 30 to 80%, and the remaining monomers are then metered in and polymerized by means of water-soluble initiators which are likewise fed in.

The emulsifiers and protective colloids can be initially charged for the preparation of the dispersion, or they can be metered in, or part is initially charged and the remainder is metered in. Here, the surface-active substances can be introduced either alone or as a preemulsion with the comonomers.

In the copolymerization of gaseous monomers such as ethylene, the desired amount is introduced by setting a particular pressure. The pressure at which the gaseous monomer is introduced can be initially set to a particular value and it can decrease during the polymerization, or the pressure is kept constant during the entire polymerization. The latter embodiment is preferred.

After conclusion of the polymerization, residual monomers can be removed by carrying out an after-polymerization using known methods, for example by means of an after-polymerization initiated by a redox catalyst. Volatile residual monomers and further volatile, nonaqueous constituents of the dispersion can also be removed by means of distillation, preferably under reduced pressure, if appropriate with inert entraining gases such as air, nitrogen or steam being passed through or over the dispersion.

The aqueous dispersions which may be obtained by the process of the invention have a solids content of from 20 to 70% by weight, preferably from 25 to 65% by weight. The solids content can also be adjusted by addition of water after the emulsion polymerization has been concluded. To produce water-redispersible polymer powders, the aqueous dispersions are, if appropriate after addition of protective colloids as atomization aid, dried, for example by means of fluidized-bed drying, freeze drying or spray drying. The dispersions are preferably spray dried. Spray drying is carried out in customary spray drying plants, with atomization effected, for example, by means of single-fluid, two-fluid or multifluid nozzles or by means of a rotary disk. The outlet temperature is generally in the range from 45° C. to 120° C., preferably from 60° C. to 90° C., depending on the plant, the Tg of the resin and the desired degree of drying.

In general, the atomization aid is used in a total amount of from 3 to 30% by weight, based on the polymeric constituents of the dispersion. Suitable atomization aids are the abovementioned protective colloids. A content of up to 1.5% by weight of antifoam, based on the base polymer, has frequently been found to be advantageous for atomization. To improve the blocking stability, the powder obtained can be admixed with an antiblocking agent (anticaking agent), preferably in an amount of up to 30% by weight, based on the total weight of polymeric constituents. Examples of antiblocking agents are Ca carbonate or Mg carbonate, talc, gypsum, silica, kaolins, and silicates.

The procedure according to the invention makes it possible to obtain silicone-containing copolymers which display complete or virtually complete bonding of the silicone component to the organic component. Extraction of free silicone macromer from a dried dispersion film is no longer possible or possible only to a very minimal extent. The dispersions obtained in this way have a series of advantages: advantageous particle size distribution, storage stability, no phase separation, no sweating-out of the silicone, no speck formation, and excellent film formation. Nonsmearing films having high cohesion and sometimes, depending on the polymerization process, highly elastic mechanical properties, are obtained.

Preference is given to the compositions of copolymers mentioned below:

polymers of vinyl acetate with silicone macromers;

vinyl ester copolymers of vinyl acetate with further vinyl esters such as vinyl laurate, vinyl pivalate, vinyl-2-ethylhexanoate, vinyl esters of an alpha-branched carboxylic acid, in particular vinyl esters of Versatic acid (VeoVa9R, VeoVa10R) and silicone macromers;

vinyl ester-ethylene copolymers, e.g. vinyl acetate-ethylene copolymers, which may contain further vinyl esters such as vinyl laurate, vinyl pivalate, vinyl 2-ethylhexanoate, vinyl esters of an α-branched carboxylic acid, in particular vinyl esters of Versatic acid (VeoVa9R, VeoVa10R) or fumaric or maleic diesters, with silicone macromers;

vinyl ester-ethylene-vinyl chloride copolymers, in which vinyl esters present are preferably vinyl acetate and/or vinyl propionate and/or one or more copolymerizable vinyl esters such as vinyl laurate, vinyl pivalate, vinyl 2-ethylhexanoate, vinyl esters of an alpha-branched carboxylic acid, in particular vinyl esters of Versatic acid (VeoVa9R, VeoVa10R), with silicone macromers;

vinyl ester-acrylic ester copolymers comprising vinyl acetate and/or vinyl laurate and/or vinyl esters of Versatic acid and acrylic esters, in particular butyl acrylate or 2-ethylhexyl acrylate, which may also contain ethylene, with silicone macromers;

acrylic ester copolymers comprising n-butyl acrylate and/or 2-ethylhexyl acrylate with silicone macromers;

methyl methacrylate copolymers with butyl acrylate and/or 2-ethylhexyl acrylate, and/or 1,3-butadiene, with silicone macromers;

styrene-1,3-butadiene copolymers and styrene-(meth) acrylic ester copolymers, e.g. styrene-butyl acrylate, styrene-methyl methacrylate-butyl acrylate or styrene-2-ethylhexyl acrylate, with silicone macromers, with n-butyl, isobutyl, tert-butyl acrylate being able to be used as butyl acrylate.

Greatest preference is given to vinyl ester-silicone macromer copolymers, in particular vinyl acetate-silicone macromer copolymers; and also copolymers of vinyl acetate and ethylene with silicone macromers, with the silicone macromer component being derived from α,ω-divinylpolydimethylsiloxane, α,ω-di(3-acryloxypropyl)polydimethylsiloxane or α,ω-di(3-methacryloxypropyl)polydimethylsiloxane and additional auxiliary monomer components being able to be present in the indicated amounts in each case.

The copolymers in the form of their aqueous dispersions and water-redispersible powders are suitable for uses in adhesives, coating compositions, also as protective coating for, for example, metals, films, wood or as release coating or for paper treatment, e.g. in the field of tissues, as binder for the consolidation of fibers or other particulate materials. They can also be used in the textile sector for textile treatment, textile coating, textile dressing or textile finishing and also in the field of fabric care. They are also suitable as modifiers and as hydrophobicizing agents. They can also advantageously be used in the field of polishes. Furthermore, the dispersions can be used as release agents. They are also suitable as binders in the building sector for paints, adhesives and coating compositions, for example in tile adhesives and adhesives for thermal insulation, and in particular for use in low-emission plastic emulsion paints and plastic emulsion renders, both for interior use and exterior use. However, they can also be used as additives, e.g. in surface-coating compositions or in cosmetic formulations such as hair sprays, creams or shampoos.

The following examples serve to illustrate the invention without restricting it in any way.

Preparation of Polymer Dispersions

Raw Materials:

Genapol X050 and X060:

$C_{13}$ oxo alcohol ethoxylate having 5 and 6 EO (manufacturer: Clariant).

PG A20-20:

Polyglycol ether having 20 EO (ethylene oxide) and 20 PO (propylene oxide), end-group-functionalized with an allyl group (manufacturer: Clariant)

Texapon K12:

Na dodecylsulfate

Brüggolite:

formaldehyde-sodium sulfoxylate (reducing agent) polyvinyl alcohol W25/140:

polyvinyl alcohol having a viscosity of about 25 mPas (20° C., 4% strength solution, measured by the Höppler method) and an OH number of 140 (mg of KOH/g of polymer) (degree of hydrolysis 88 mol %). Manufacturer: Wacker Specialties PDMS mixture (Wacker Dehesive® 929):

mixture of three polydimethylsiloxanes having about 100 $SiOMe_2$ units and containing 5% by weight of unfunctionalized polydimethylsiloxane, 20% by weight of α-monovinyl-functionalized polydimethylsiloxane and 75% by weight of α,ω-divinyl-functionalized polydimethylsiloxane.

VIPO 200, 300, 500:

polydimethylsiloxanes having about 100, 133 and 177 $SiOMe_2$ repeating units, α,ω-divinyl-functionalized. Manufacturer: Wacker-Chemie GmbH Comparative Example 1

No Oil-Soluble Initiator 1.91 kg of water, 2.53 kg of W 25/140 (polyvinyl alcohol, 10% strength aqueous solution), 96.06 g of Genapol X 060 (100% strength), 10.94 g of Texapon K12, 3.96 g of sodium acetate, 606.72 g of vinyl acetate and 404.48 g of PDMS mixture were placed in a 20 liter pressure autoclave. The pH was set to 5 by means of 10% strength formic acid. In addition, 10 ml of Trilon B (EDTA; 2% strength aqueous solution) and 31 ml of iron ammonium sulfate (1% strength solution) were added. The vessel was heated to 70° C. and pressurized with 8 bar of nitrogen. As soon as the reactor was in thermal equilibrium, 42 g/h of a 5.8% strength ammonium persulfate solution (APS solution) and 88 g/h of a 2.68% strength sodium sulfite solution were fed in. After 25 minutes, metered addition of a mixture of 2.43 kg of vinyl acetate and 1.62 kg of PDMS mixture at a rate of 1010 g/h was commenced (monomer feed stream). At the same time, an emulsifier feed stream was fed in at a rate of 300 g/h. The emulsifier feed stream comprised 758.40 g of water, 384.26 g of Genapol X 060, 15.86 g of sodium acetate and 43.76 g of Texapon K12. The total time of introduction of the monomer feed stream was 4 hours, and the emulsifier feed stream was likewise fed in over 4 hours.

20 minutes after commencement of the reaction, the APS feed stream was increased to 63 g/h and the Na sulfite feed stream was increased to 131 g/h.

After the monomer feed stream and emulsifier feed stream had all been fed in, the introduction of APS and of Na sulfite was continued for 1 hour. After depressurization, the dispersion was treated with steam (stripped) to minimize the residual monomer content and Hydorol W was subsequently added as preservative.

Dispersion analyses:

Solids content: 44.9%; pH: 5.0; Brookfield viscosity 20 (spindle 4), 860 MPas; MFT: 0° C.; glass transition temperature Tg: 16.7° C.; mean particle size: 422.3 nm (Nanosizer) Coulter: Dn 0.274; Dv 0.891; surface area: 14.0 $m^2$ Soxhlet extraction: residue after complete evaporation of eluate: 2.14 g=42.8% (extracted from 5 g of a dried dispersion film).

Comparative Example 2

No Oil-Soluble Initiator 1.29 kg of water, 2.67 kg of W 25/140 (polyvinyl alcohol, 10% strength aqueous solution), 101.55 g of Genapol X 050 (100% strength), 115.66 g of Texapon K12 (10% strength aqueous solution), 4.19 g of sodium acetate, 641.34 g of vinyl acetate and 427.56 g of polydimethylsiloxane (VIPO 300) were placed in a 20 liter pressure autoclave. The pH was set to 5 by means of 10% strength formic acid. In addition, 10 ml of Trilon B (EDTA; 2% strength aqueous solution) and 31 ml of iron ammonium sulfate (1% strength solution) were added. The vessel was heated to 70° C. and pressurized with 8 bar of nitrogen. As soon as the reactor was in thermal equilibrium, 84 g/h of a 5.8% strength ammonium persulfate solution (APS solution) and 176 g/h of a 2.68% strength sodium sulfite solution were fed in. After 25 minutes, introduction of a mixture of 2.57 kg of vinyl acetate and 1.71 kg of VIPO 300 at a rate of 2140 g/h was commenced (monomer feed stream).

At the same time, an emulsifier feed stream was fed in at a rate of 625 g/h. The emulsifier feed stream comprised 385.32 g of water, 406.18 g of Genapol X 060 and 462.62 g of Texapon K12 (10% strength aqueous solution). The total time of introduction of the monomer feed stream and the emulsifier feed stream was 2 hours.

20 minutes after commencement of the reaction, the APS feed stream was increased to 126 g/h and the Na sulfite feed stream was increased to 262 g/h.

After all the monomer feed stream and emulsifier feed stream had been fed in, the introduction of APS and of Na sulfite was continued for 1 hour. After depressurization, the dispersion was treated with steam (stripped) to minimize the residual monomer content and Hydorol W was subsequently added as preservative.

Dispersion analyses:

Solids content: 50.5%, pH: 5.3; Brookfield viscosity 20 (spindle 4): 1040 mPas; MFT: 0° C.; glass transition temperature Tg: 18.4° C.; mean particle size: 452.5 nm (Nanosizer); Coulter: Dn 0.124; Dv 1.697; surface area: 14.7 $m^2$ Soxhlet extraction: residue after complete evaporation of eluate: 1.94 g=38.8% (extracted from 5 g of a dried dispersion film).

Comparative Example 3

Only Oil-Soluble Initiator; Batch Process, No Feed Streams 3.61 kg of water, 2.54 kg of W 25/140 (polyvinyl alcohol, 10% strength aqueous solution), 481.67 g of Genapol X 050 (100% strength), 54.86 g of Texapon K12 (100% strength aqueous solution), 3.98 g of sodium acetate, 3.04 kg of vinyl acetate and 2.03 kg of PDMS mixture were placed in a 20 liter pressure autoclave. 21.35 g of tert-butyl perneodecanoate (Trigonox 23, TBPND, 95% strength in aliphatics) and 13.52 g of di(2-ethylhexyl)peroxydicarbonate (EHPC; 75% strength in aliphatics) were additionally present in the initial charge. The pH was set to 5 by means of 10% strength formic acid. In addition, 10 ml of Trilon B (EDTA; 2% strength aqueous solution) and 31 ml of iron ammonium sulfate (1% strength solution) were added. The vessel was firstly heated to 45° C. to start the polymerization. After 2 hours, it was heated to 50° C. After a further 2 hours, the temperature was increased to 55° C. and maintained for 2 hours.

After cooling and depressurization, the dispersion was treated with steam (stripped) to minimize the residual monomer content and Hydorol W was subsequently added as preservative.

Dispersion analyses:

Solids content: 46.1%, pH: 5.3; Brookfield viscosity 20 (spindle 4): 2690 mPas; MFT: 0° C.; glass transition temperature Tg: 15.6° C.; mean particle size: 678.7 nm (Nanosizer); Coulter: Dn 0.0995; Dv 12.67; surface area: 3.83 $m^2$ Soxhlet extraction: not carried out.

The dispersion was unstable and displayed phase separation within 24 hours!

Example 4

Combination of Oil-Soluble Initiator/Water Soluble Initiator 1.17 kg of water, 2.78 kg of W 25/140 (polyvinyl alcohol, 10% strength solution), 47.33 g of Genapol X 050 (100% strength), 120.5 g of Texapon K12 (10% strength aqueous solution), 4.37 g of sodium acetate, 556.83 g of vinyl acetate, 2230 g of VIPO 300 and 41.03 g of Trigonox 23 (tert-butyl peroxyneodecanoate, TBPND, 95% strength in aliphatics-oil-soluble initiator) were placed in a 20 liter pressure autoclave. The pH was set to 5 by means of 10% strength formic acid. In addition, 10 ml of Trilon B (EDTA; 2% strength aqueous solution) and 31 ml of iron ammonium sulfate (1% strength solution) were added. The vessel was heated to 70° C. and pressurized with 8 bar of nitrogen. The initial charge was initially polymerized for 30 minutes. After these 30 minutes, 116 g/h of an 11.2% strength tert-butyl hydroperoxide solution (TBHP solution) and 326 g/h of a 2.0% strength Brüggolite solution were fed in. At the same time, the introduction of 2.78 kg of vinyl acetate at a rate of 1390 g/h was commenced (monomer feed stream).

The two emulsifier feed streams were fed in immediately afterwards. The Texapon feed stream comprised 111.37 g of water and 481.99 g of Texapon K12 (10% strength aqueous solution) and was fed in at a rate of 297 g/h. The Genapol feed stream comprised 189.32 g of Genapol X050 (100% strength) and was fed in at a rate of 95 g/h. The total time of introduction of the monomer feed stream and the emulsifier feed stream was 2 hours.

After all the monomer feed stream and emulsifier feed stream had been fed in, the introduction of the TBHP feed stream and the Brüggolite feed stream was continued for 1 hour. After depressurization, the dispersion was treated with steam (stripped) to minimize the residual monomer content and Hydorol W was subsequently added as preservative.

Dispersion analyses:

Solids content: 48.4%, pH: 5.5; Brookfield viscosity 20 (spindle 4): 6040 mPas; MFT: not determined; glass transition temperature Tg: 24.5° C.; mean particle size: 643.2 nm (Nanosizer); Coulter: Dn 0.105; Dv 2.790; surface area: 9.37 $m^2$ Soxhlet extraction: residue after complete evaporation of eluate: 0.44 g=8.8% (extracted from 5 g of a dried dispersion film). 1H-NMR of the dried extract: The constituents are mainly aliphatics (stabilizer for the initiator and initiator fragments), protective colloid and emulsifier. Only a minimal amount of silicone was found.

Excellent film properties (no smearing and sweating-out of silicone; dispersion film has elastic properties).

Example 5

Feed Stream Variant During the Initial Polymerization; Combination of Oil-Soluble Initiator/Water-Soluble Initiator 974.0 g of water, 2.32 kg of W 25/140 (polyvinyl alcohol, 10% strength solution), 39.36 g of Genapol X 050), 100.2 g of Texapon K12 (10% strength aqueous solution), 3.63 g of sodium acetate, 1850 g of VIPO 300 and 68.24 g of Trigonox 23 (tert-butyl peroxyneodecanoate, TBPND, 95% strength in aliphatics oil-soluble initiator) were placed in a 20 liter pressure autoclave. The pH was set to 5 by means of 10% strength formic acid. In addition, 10 ml of Trilon B (EDTA; 2% strength aqueous solution) and 31 ml of iron ammonium sulfate (1% strength solution) were added. The vessel was heated to 70° C. and pressurized with 8 bar of nitrogen. When the temperature of 70° C. had been reached, the introduction of 463.1 g of vinyl acetate over a period of half an hour was commenced. After a further initial polymerization time of half an hour, 2320 g of vinyl acetate (monomer feed stream) were fed in at a rate of 925 g/h. The total time of introduction of the monomer feed stream was 150 minutes. 30 minutes after the introduction of the monomer feed stream had commenced 97 g/h of an 11.2% strength tert-butyl hydroperoxide solution (TBHP solution) and 271 g/h of a 2.0% strength Brüggolite solution were fed in.

The two emulsifier feed streams were fed in immediately afterwards. The Texapon feed stream comprised 92.6 g of water and 400.8 g of Texapon K12 (10% strength aqueous solution) and was introduced at a rate of 247 g/h. The Genapol feed stream comprised 157.44 g of Genapol X050 (100% strength) and was introduced at a rate of 79 g/h. The total time of introduction of the emulsifier feed streams was 2 hours.

After all the emulsifier feed stream had been introduced, the introduction of the TBHP feed stream and the Brüggolite feed stream was continued for 1 hour. After depressurization, the dispersion was treated with steam (stripped) to minimize the residual monomer content and Hydorol W was subsequently added as preservative.

Dispersion analyses:

Solids content: 45.8%, pH: 5.1; Brookfield viscosity 20 (spindle 4): 1800 mPas; MFT: 0° C.; glass transition temperature Tg: 21.0° C.; mean particle size: 1153.8 nm (Nanosizer); Coulter: Dn 0.0979; Dv 3.834; surface area: 5.93 $m^2$;

Soxhlet extraction: residue after complete evaporation of eluate: 0.32 g=5.4% (extracted from 5 g of a dried dispersion film). 1H-NMR of the dried extract: The constituents are mainly aliphatics (stabilizer for the initiator and initiator fragments), protective colloid and emulsifier. Only a vanishingly small amount of silicone was found, i.e. virtually all of the silicone macromer has been copolymerized.

Excellent film properties (no smearing and sweating-out of silicone; dispersion film has elastic properties).

Example 6

With PEG-PPG Allyl Ether 1.16 kg of water, 2.77 kg of W 25/140 (polyvinyl alcohol, 10% strength solution), 47.07 g of Genapol X 050 (100% strength), 119.84 g of Texapon K12 (10% strength aqueous solution), 4.34 g of sodium acetate, 553.77 g of vinyl acetate, 2220 g of VIPO 300, 50.39 g of polyglycol A20-20 (100% strength, polyethylene oxide-polypropylene oxide allyl ether) and 41.03 g of Trigonox 23 (tert-butyl peroxyneodecanoate, TBPND, 95% strength in aliphatics-oil-soluble initiator) were placed in a 20 liter pressure autoclave. The pH was set to 5 by means of 10% strength formic acid. In addition, 10 ml of Trilon B (EDTA; 2% strength aqueous solution) and 31 ml of iron ammonium sulfate (1% strength solution) were added. The vessel was heated to 70° C. and pressurized with 8 bar of nitrogen. The initial charge was initially polymerized for 30 minutes. After these 30 minutes, 116 g/h of an 11.2% strength tert-butyl hydroperoxide solution (TBHP solution) and 326 g/h of a 2.0% strength Brüggolite solution were fed in. At the same time, introduction of a mixture of 2.49 kg of vinyl acetate and 226.49 g of polyglycol A20-20 (polyethylene oxide-polypropylene oxide allyl ether) at a rate of 1360 g/h was commenced (monomer feed stream). The two emulsifier feed streams were fed in immediately afterwards. The Texapon feed stream comprised 110.75 g of water and 479.35 g of Texapon K12 (10% strength aqueous solution) and was introduced at a rate of 296 g/h. The Genapol feed stream comprised 188.3 g of Genapol X050 and was introduced at a rate of 95 g/h. The total time of introduction of the monomer feed stream and the emulsifier feed streams was 2 hours.

After all the monomer feed stream and emulsifier feed streams had been introduced, the introduction of the TBHP feed stream and the Brüggolite feed stream was continued for 1 hour. After depressurization, the dispersion was treated with steam (stripped) to minimize the residual monomer content and Hydrol W was subsequently added as preservative.

Dispersion analyses:

Solids content: 48.8%, pH: 5.0; Brookfield viscosity 20 (spindle 4): 30 850 mPas; MFT: 0° C.; glass transition temperature Tg: 9.7° C.; mean particle size: 508.3 nm (Nanosizer); Coulter: Dn 0.0962; Dv 11.50; surface area: 4.7 $m^2$;

Soxhlet extraction: residue after complete evaporation of eluate: 0.355 g=7.1% (extracted from 5 g of a dried dispersion film). Excellent film properties (no smearing and sweating-out of silicone; dispersion film has elastic properties).

Comparative Example 7

Without Silicone Macromer

Like Example 6 but without VIPO 300, i.e. the polymerization was carried out without a silicone macromer.

Dispersion analyses:

Solids content: 48.1%, pH: 5.5; Brookfield viscosity 20 (spindle 4): 1240 mPas; MFT: not determined; glass transition temperature Tg: 13.4° C.; mean particle size: 1094.1 nm (Nanosizer), Coulter: Dn 0.106; Dv 3.322; surface area: 6.06 $m^2$.

Soxhlet extraction: residue after complete evaporation of eluate: 0.30 g=6.0% (extracted from 5 g of a dried dispersion film).

Example 8

Functional Comonomer

Like Example 6 but with NMA (N-methylolacrylamide). 57.08 g of NMA were introduced with the initial charge, and 228.34 g of NMA were fed in with the Texapon feed stream. VIPO 200 was used instead of VIPO 300 as silicone macromer.

The end product had a solids content of 47.0% and a viscosity (Brookfield 20, spindle 6) of 25 800 mPas. After dilution with water to 29.7%, a Brookfield viscosity 20 (spindle 2) of 204 mPas was found.

Dispersion analyses:

Solids content: 29.7%, pH: 6.1; Brookfield viscosity 20 (spindle 2): 204 mPas; MFT: not determined; glass transition temperature Tg: 5.65° C.; mean particle size: 1118.0 nm (Nanosizer), Coulter: Dn 4.554; Dv 6.010; surface area: 1.11 $m^2$.

Soxhlet extraction: residue after complete evaporation of eluate: 0.495 g=9.9% (extracted from 5 g of a dried dispersion film).

Example 9

Functional Comonomer

Like Example 6 but with 55.24 g of acrylic acid (11.05 g in the initial charge, 44.19 g in the monomer feed stream). VIPO 200 was used instead of VIPO 300 as silicone macromer.

Dispersion analyses:

Solids content: 48.6%, pH: 5.4; Brookfield viscosity 20 (spindle 2): 9600 mPas; MFT: 1° C.; glass transition temperature Tg: not determined; mean particle size: 322.0 nm (Nanosizer); Coulter: Dn 0.102; Dv 43.45; surface area: 6.06 $m^2$.

Soxhlet extraction: residue after complete evaporation of the eluate: 0.485 g=9.7% (extracted from 5 g of a dried dispersion film).

Example 10

Vinyl Acetate-Ethylene Copolymer 1.68 kg of water, 2.43 kg of W 25/140 (polyvinyl alcohol, 10% strength solution), 41.24 g of Genapol X 050 (100% strength), 105.0 g of Texapon K12 (10% strength aqueous solution), 3.80 g of sodium acetate, 485.2 g of vinyl acetate, 1940 g of VIPO 300 and 35.75 g of Trigonox 23 (tert-butyl peroxyneodecanoate, TBPND, 95% strength in aliphatics) were placed in a 20 liter pressure autoclave. The pH was set to 5 by means of 10% strength formic acid. In addition, 10 ml of Trilon B (EDTA; 2% strength aqueous solution) and 31 ml of iron ammonium sulfate (1% strength solution) were added. The vessel was heated to 70° C. and pressurized with 20 bar ethylene and this pressure was maintained until all of the monomer feed stream had been introduced. The initial charge was initially polymerized for 30 minutes. After these 30 minutes, 96 g/h of an 11.2% strength tert-butyl hydroperoxide solution (TBHP solution) and 269 g/h of a 2.0% strength Brüggolite solution were fed in. At the same time, the introduction of 2.43 kg of vinyl acetate at a rate of 1215 g/h was commenced (monomer feed stream).

The two emulsifier feed streams were fed in immediately afterwards. The Texapon feed stream comprised 97.04 g of water and 419.99 g of Texapon K12 (10% strength aqueous solution) and was introduced at a rate of 259 g/h. The Genapol feed stream comprised 164.97 g of Genapol X050 (100% strength) and was introduced at a rate of 83 g/h. The total time of introduction of the monomer feed stream and the emulsifier feed streams was 2 hours.

After all of the monomer feed stream and emulsifier feed streams had been introduced, the introduction of the TBHP feed stream and the Brüggolite feed stream was continued for 1 hour. After depressurization, the dispersion was treated with steam (stripped) to minimize the residual monomer content and Hydrol W was subsequently added as preservative.

The end product had a solids content of 48.0% and a viscosity (Brookfield 20, spindle 6) of 36 600 mPas.

After dilution with water to 34.6%, a Brookfield viscosity 20 (spindle 2) of 810 mPas was found.

Dispersion analyses:

Solids content: 34.6%, pH: 5.7; Brookfield viscosity 20 (spindle 4): 810 mPas; MFT: 0° C.; glass transition temperature Tg: −1.3° C.; mean particle size: 670.6 nm (Nanosizer); Coulter: Dn 0.139; Dv 1.151; surface area: 14.9 $m^2$;

Soxhlet extraction: residue after complete evaporation of eluate: 0.30 g=6.0% (extracted from 5 g of a dried dispersion film). 1H-NMR of the dried extract: The constituents are mainly aliphatics (stabilizer for the initiator and initiator fragments), protective colloid and emulsifier. No silicone was found, i.e. all of the silicone macromer has been copolymerized.

Excellent film properties (no smearing and sweating-out of silicone; dispersion film has elastic properties and, owing to the low Tg, good tack properties).

Use test (Soxhlet extraction):

A film was produced from each of the dispersions and dried completely. Precisely 5.0 g of each of these films was taken and placed in a Soxhlet extraction apparatus. 50 g of cyclohexane were used as extractant. Cyclohexane is a very good solvent for silicones and can extract free silicone completely from a dispersion film. The Soxhlet extraction was carried out for 8 hours under reflux. After extraction, the collected eluate (with the constituents extracted from the dispersion films) was evaporated completely on a rotary evaporator. The residue was, if required, analyzed by 1H-NMR spectroscopy to determine its composition.

The residue of the eluate was divided by the mass of the dried dispersion film which had been extracted (here 5.0 g) and the percentage was calculated.

Note: the higher the proportion in % of material extracted from a dispersion film, the less silicone macromer has been bound in the emulsion polymerization. The results are summarized in Table 1:

Evaluation of the experimental results:

Comparative examples C1 and C2 show that unsatisfactory bonding of the silicone macromers to organic monomer occurs in the emulsion polymerization when only water-soluble initiators are used. Far more than 30% can be washed out of the dried dispersion film in the extraction in these cases. 1H-NMR spectroscopy demonstrates that the major part of the extractable constituents is free silicone macromer. Comparative example C3 shows when only oil-soluble initiators are used, the stability of the dispersion is unsatisfactory. In this case, phase separation occurred after a short time.

In Examples 4 and 6 and also 8 and 10, a combination of water-soluble and oil-soluble initiators was employed. Only a small amount of constituents, less than 10%, could be extracted from the films of these dispersions. This is evidence that very effective bonding of silicone macromers to organic monomer is possible in emulsion polymerization when the procedure according to the invention is used.

Comparison of Example 4 with Example 5 demonstrates that more effective and more complete copolymerization of silicone macromers with organic monomers is made possible when the proportion of oil-soluble initiator is increased (from 0.7 in Example 4 to 1.4 parts in Example 5). Thus, only 5.4% could be extracted from the film of the dispersion from Example 5, while the extractable constituents in the film of the dispersion from Example 4 were 8.8%.

In the presence of auxiliary monomers, polymerizable emulsifiers or protective colloids, too, a very good copolymerization or very good bonding of silicone macromers to organic monomers is achieved in the emulsion polymerization by means of the combination of oil-soluble and water-soluble initiators, as Examples 6, 8 and 9 demonstrate.

In the blank experiments without silicone macromer, 6.0% of constituents could be extracted from the dispersion films in Comparative example C7. Here, emulsifiers, protective colloids, initiator fragments and stabilizers (e.g. aliphatics of the initiator) were extracted, which was confirmed by 1H-NMR spectroscopy on the dried residue. The 1H-NMR spectrum indicated no free silicone at all in the dried residue of the eluate after extraction in these cases. In Example 5, too, virtually all of the silicone macromer had been copolymerized, and only a minimal amount of free silicone macromer was present in the other examples. This once again documents the excellent copolymerization of the silicone macromers with organic monomers in the process of the invention.

TABLE 1

| Example | $H_2O$-soluble initiator | Oil-soluble initiator | Proportion of silicone [parts] | Auxiliary monomer/comonomer [parts] | Extract [%] |
|---|---|---|---|---|---|
| C1 | + | − | 40 of DEH 929 | — | 42.8 |
| C2 | + | − | 40 of VIP0 300 | — | 38.8 |
| C3 | − | + | 40 of DEH 929 | — | unstable |
| 4 | + | + | 40 of VIPO 300 | — | 8.8 |
| 5 | + | + | 40 of VIPO 300 | — | 5.4 |
| 6 | + | + | 40 of VIPO 300 | 5 of PG A-20 | 7.1 |
| C7 | + | + | 0 | 10 of PG A-20 | 6.0 |
| 8 | + | + | 40 of VIPO 200 | 3 of NMA | 9.9 |
| 9 | + | + | 40 of VIPO 200 | 1 of acrylic acid | 9.7 |
| 10 | + | + | 40 of VIPO 300 | 15 of ethylene | 6.0 |

The invention claimed is:

1. A process for preparing an aqueous dispersion of silicone-containing copolymers of an ethylenically unsaturated organic monomer and a silicone macromer, or a water-redispersible polymer powder prepared therefrom, comprising: initially charging at least one silicone macromer and a portion of ethylenically unsaturated organic monomer(s); initiating polymerization with an oil-soluble free radical polymerization initiator having a solubility in water of <1% by weight; and subsequently adding the remainder of the ethylenically unsaturated organic monomer(s) and a water-soluble initiator having a solubility in water of >10% by weight to form an aqueous polymer dispersion, and optionally drying an aqueous polymer dispersion thereby obtained to form a redispersible polymer powder.

2. The process of claim 1, wherein the initial charge is polymerized to a conversion of from 10 to 100%, the remaining monomers are then metered in and polymerized by means of a water-soluble initiator which is likewise fed in.

3. The process of claim 1, wherein the ethylenically unsaturated organic monomer comprises one or more monomers selected from the group consisting of vinyl esters of unbranched or branched alkylcarboxylic acids having from 1 to 15 carbon atoms, (meth)acrylic esters of alcohols having from 1 to 15 carbon atoms, vinylaromatics, olefins, dienes and vinyl halides.

4. The process of claim 1, wherein one or more linear, branched, or cyclic silicones having at least 10 siloxane repeating units and having at least one free-radically polymerizable functional group are used as silicone macromers.

5. The process of claim 1, wherein one or more silicones of the formula $R^1_a R_{3-a} SiO(SiR_2O)_n SiR_{3-a} R^1_a$, where radicals R are identical or different monovalent, substituted or unsubstituted alkyl radicals or alkoxy radicals having from 1 to 18 carbon atoms, $R^1$ is a polymerizable group, a is 0 or 1 and n=10 to 1000, are used as silicone macromers.

6. The process of claim 3, wherein vinyl acetate or a mixture of vinyl acetate and ethylene is copolymerized with at least one silicone macromer selected from the group consisting of α,ω-divinylpolydimethylsiloxane, α,ω-di(3-acryloxypropyl)polydimethylsiloxane and α,ω-di(3-methacryloxypropyl)polydimethylsiloxane.

7. The process of claim 1, wherein one or more precrosslinking or postcrosslinking auxiliary comonomers are used.

* * * * *